Oct. 27, 1964  R. L. WEISS ETAL  3,153,801
PAINT BRUSHES

Filed Feb. 1, 1962  2 Sheets-Sheet 2

INVENTOR.

BY Meyer, Baldwin, Doan & Egan
ATTORNEYS.

United States Patent Office 3,153,801
Patented Oct. 27, 1964

3,153,801
PAINT BRUSHES
Robert L. Weiss and Earl R. Hunt, Wooster, and Donald R. Forry, Hilliard, Ohio, assignors, by direct and mesne assignments, to The Wooster Brush Company, Wooster, Ohio, a corporation of Ohio
Filed Feb. 1, 1962, Ser. No. 170,319
4 Claims. (Cl. 15—193)

This invention relates to paint brushes and like structures and particularly to means for integrally bonding a handle to a bristle portion of a brush.

The invention has for its primary object the provision of a device of the aforesaid nature which is characterized by its structural simplicity, its inexpensive manufacturing cost, the ease of assembly of its parts, the attractive forms in which the device may be made, and the particularly effective manner in which it performs its function.

A more specific object of the invention is to provide a molded brush handle having extension means integral therewith and means for integrally bonding said extension means to a bristle portion.

Another object of the invention is to provide a brush of the above type wherein the extension means interlocks with the bonding means in such manner as to prevent their separation from each other.

Still another object of the invention is to provide a brush structure as set forth above having a lightweight, hollow plastic handle and including reinforcing means for preventing lateral, inward collapsing of the wall portions of the handle in the area of its attachment to the bristle portion.

Further objects of the present invention, and a number of its advantages, will be referred to in or will be evident from the following description of four embodiments of the invention, illustrated in the accompanying drawings, in which.

Figure 1:
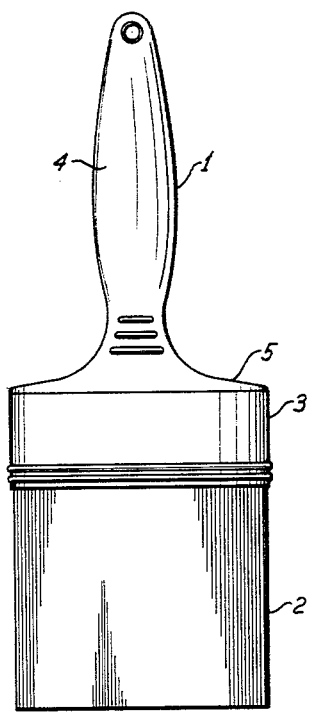
FIG. 1 is a front elevation of a paint brush constructed according to the first embodiment of the invention.
Figure 2:
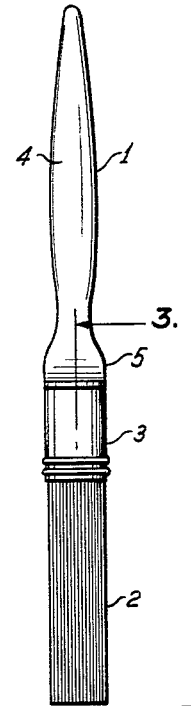
FIG. 2 is a side elevation of the paint brush shown in FIG. 1.

Before the device here illustrated is specifically described, it is to be understood that the invention here involved is not limited to the structural details or arrangement of parts here shown since brushes embodying the present invention may take various forms. It is also to be understood that the phraseology or terminology herein employed is for purposes of description and not of limitation since the scope of the present invention is denoted by the appended claims.

Referring now to the drawings and particularly to the first embodiment of FIGS. 1-4, there is provided a paint brush comprising a handle 1, a bristle portion 2, and a connecting ferrule 3. The handle 1 is preferably made of a suitable plastic and is of hollow construction formed to provide a gripping portion 4 projecting upwardly from an enlarged bristle receiving portion 5. As herein illustrated, the bristle receiving portion is generally oblong in horizontal section and has a downwardly extending, peripherally continuous wall 6 having a pair of generally flat, parallel side portions 7. Integrally formed with the hollow bristle receiving portion 5 are a plurality of laterally directed webs 8 and 9 which connect the side portions 7 to each other and laterally reinforce the bristle receiving portion against lateral inward collapse of said side portions.

Figure 3:
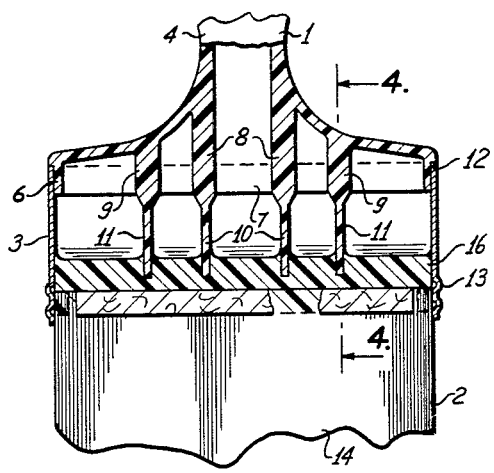
FIG. 3 is a fragmentary section taken generally along the line 3—3 of FIG. 2.

A first pair of webs 8 extend downwardly generally below the walls of the gripping portion 4 as shown in FIG. 3, and a second pair of webs 9 are evenly spaced on either side of and outwardly from the said webs 8. All of these webs are of substantial thickness and extend downwardly generally to the level of the lower edge of the peripheral wall 6. Integrally formed with the webs 8 and 9 are downwardly directed extensions 10 and 11 respectively which extend downwardly a substantial distance below the lower edge of said wall. The outer surface of the wall 6, adjacent its upper end, is provided with a downwardly facing step 12 against which the upper peripheral edge of the ferrule 3 seats.

The ferrule 3 fits tightly around and against the peripheral wall 6 and extends downwardly therefrom a substantial distance below the lower ends of the extensions 10 and 11. The lower end portion of said ferrule is preferably provided with one or more integrally formed, reinforcing ribs or beads 13.

The bristle portion 2 as herein illustrated comprises a multiplicity of closely packed bristles 14 centrally divided at their upper ends by a separation strip 15 which is disposed parallel with the side portions 7.

The upper end of the bristle portion 2, including the separation strip 15, is disposed within the lower end portion of the ferrule 3 with the upper ends of the bristles 14 and the upper surface of the separation strip being spaced slightly below the lower ends of the extensions 10 and 11 of the webs 8 and 9. A suitable bonding compound, such as an epoxide containing composition, is disposed within the ferrule 3 just above the bristle portion 2 and extends upwardly above the lower end portions of the extensions 10 and 11.

Figure 4:
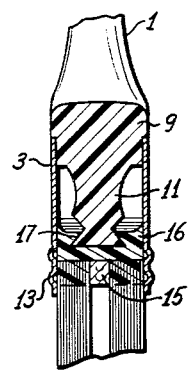
FIG. 4 is a fragmentary section taken generally along the line 4—4 of either FIG. 3 or FIG. 5.

As shown in FIG. 4, the extensions 10 and 11 are somewhat narrower than the webs 8 and 9 and are provided adjacent their lower ends with upwardly converging edge portions 17 disposed below the upper surface of the bonding compound 16. The lower ends of the extensions thereby afford a dovetail interfit with the bonding compound which mechanically interlocks said extensions with said compound.

The bonding compound 16 is initially disposed within the ferrule 3 in a liquid state whereby a portion thereof flows downwardly and permeates the upper ends of the bristles 14 to form a solid bristle knot in the area of the separation strip 15. The remainder of the compound surrounds the lower end portions of the extensions 10 and 11 when the bristle receiving portion of the handle is subsequently inserted in the upper end of the ferrule. If desired, the bristle knot may be bonded by a small amount of the compound and allowed to solidify before insertion of the handle in the ferrule 3 in which case the handle is subsequently secured in place by additional bonding compound disposed thereabove in sufficient amounts to cover the edge portions 17 of the extensions. In either case it will be seen that the bonding compound 16, in its solidified state, rigidly bonds the upper ends of the bristle portions, the lower ends of the extensions, and a portion of the inner wall surfaces of the ferrule to each other. Additionally, the dovetail interfit of the edge portions 17 of the extensions are mechanically interlocked with this solidified bonding compound whereby even without the bonding effect, the bristle portion would be retained against displacement from the handle 1.

Figure 5:
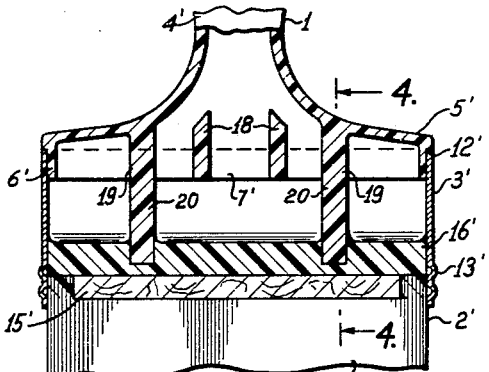
FIG. 5 is a section similar to FIG. 3 showing a second embodiment of the invention.

The second embodiment of FIG. 5 is quite similar to the first embodiment and has the same cross sectional shape as seen from the section line 4—4. Those parts which have remained unchanged in the second embodiment have been given the same reference numerals as like parts of the first embodiment with the numerals of the second embodiment being primed.

The brush of FIG. 5, therefore, has a handle 1', a bristle portion 2' and an interconnecting ferrule 3'. The handle comprises an upwardly extending gripping portion 4' (only partially shown) and an enlarged bristle receiving portion 5'. The bristle receiving portion has a downwardly extending, peripheral wall 6' having parallel side portions 7' and a downwardly facing, outwardly directed step 12' against which the upper end of the ferrule 3' seats. The lower end portion of said ferrule 3' has reinforcing ribs or beads 13', and the upper end of the bristle portion 2' is disposed within the lower end portion of said ferrule. The bristle portion 2' comprises a multiplicity of closely packed bristles 14' having a separation strip 15' at their upper ends and bonding compound 16' disposed thereabove within the ferrule.

The difference between the first and second embodiment is in the area of the web. The second embodiment has a pair of webs 18 which connect the parallel side portions 7' just below but separate from the walls of the hollow gripping portion 4'. Spaced outwardly therefrom are another pair of webs 19 which are substantially thicker than the webs 18 and which have downwardly directed extensions 20 projecting downwardly a distance substantially equal to the lower extent of the extensions 10 and 11 of the first embodiment. In vertical section, transversely of the bristle receiving portion 3', the extensions 20 have the same dovetail shape at their lower ends as found in the extensions 10 and 11 of the first embodiment but are of the same thickness as their associated webs. As in the first embodiment, the webs 19 of the second embodiment reinforce the side portions 7' of the wall 6' against lateral inward collapse, and the extensions 20 of the webs provide a mechanical interlock with the solidified bonding compound 16'.

Figure 7:
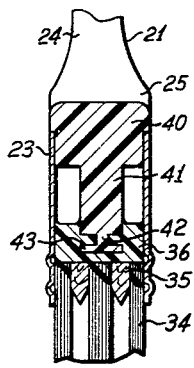
FIG. 7 is a section taken generally along the line 7—7 of FIG. 6.
Figure 6:
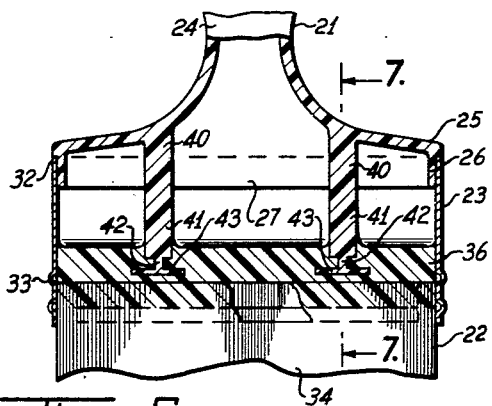
FIG. 6 is a section similar to FIGS. 3 and 5 showing a third embodiment of the invention.

The third embodiment of the invention as shown in FIGS. 6 and 7 is basically constructed in the same manner as the first two embodiments, the main difference residing in the downwardly directed extension means or the parts corresponding in purpose and function to the webs 8 and 9 and their respective extensions 10 and 11 of the first embodiment or the webs 19 and extensions 20 of the second embodiment. The third embodiment comprises a hollow, plastic handle 21, a bristle portion 22, and a preferably metallic ferrule 23. The handle 21 has a gripping portion 24 and an enlarged bristle receiving portion 25 with the latter having a downwardly directed, skirtlike wall 26 having parallel side portions 27. The outer surface of the wall 26 is stepped at 32 to receive the upper end of the ferrule 23 seated thereagainst.

The bristle portion 22 comprises bristles 34 grouped at their upper ends around a pair of separation strips 35 in the area of the bristle knot. The lower end portion of the ferrule 23 is provided with horizontally disposed, reinforcing ribs or beads 33, and the bristle knot is disposed within this lower end portion of said ferule. Bonding compound 36 permeates and solidifies the bristle knot and extends upwardly a substantial distance within the ferrule 23, bonding itself to the inner surface of said ferrule 23, in the manner described in connection with the first two embodiments of the invention.

The side portions 27 of the wall 26 are laterally connected by webs 40 which are spaced a substantial distance on either side of the center line of the brush as illustrated in FIG. 6. As shown in FIG. 7, laterally reduced extensions 41 project downwardly from the webs 40 and are provided at their ends with further reduced portions 42. The lowermost ends of the reduced portions 42 are provided with horizontally outwardly directed flanges 43 which extend horizontally in every direction and provide, in effect, a platelike foot or base for said extensions.

It will be readily seen that the footlike flanges 43 embedded in the solidified compound 36 effectively mechanically anchor the lower ends of the extensions 41 into said bonding compound. Even without the bonding effect of the compound, the extensions 41 and their associated reduced portions 42 and flanges 43 could not be pulled away from the bristle portions 22 without breaking some part of the extension.

Figure 11:
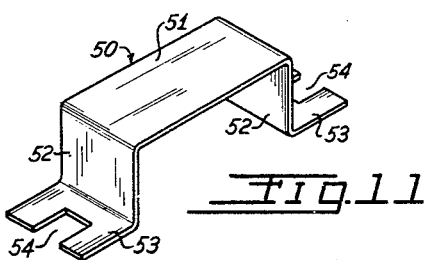
FIG. 11 is a perspective view of a reinforcing insert member of the fourth embodiment of the invention.

The fourth embodiment of the invention as shown in FIGS. 8–11 is identical with the third embodiment of FIGS. 6 and 7 with the exception that the fourth embodiment has added thereto a reinforcing insert 50 which is separately illustrated in FIG. 11. The purpose of the insert is to provide additional lateral reinforcement for the side portions 27 of the wall 26 to prevent inward collapse of said side portions.

The insert 50 is preferably made of deformable sheet metal but may be made of plastic or other suitable material. Said insert is made of a single piece of sheet material and comprises a flat, elongated body 51 having downwardly directed, right angularly disposed legs 52 the lower ends of which are provided with right angularly outwardly directed connector portions 53. Each connector portion is centrally notched at its outwardly directed edge as indicated at 54.

The material from which the insert 50 is manufactured is preferably deformable so that the legs 52 can be bent inwardly toward each other and then subsequently outwardly to their original positions for the purpose of mounting said insert between the extensions 41 of the handle 21. For this purpose, the insert 50 may also be made of spring material whereby the body portion 51 will bow upwardly or outwardly when inward pressure is applied to the legs 52 with the said legs subsequently snapping back to their original positions upon release of the pressure and straightening of the body 51.

Figures 9, 10:
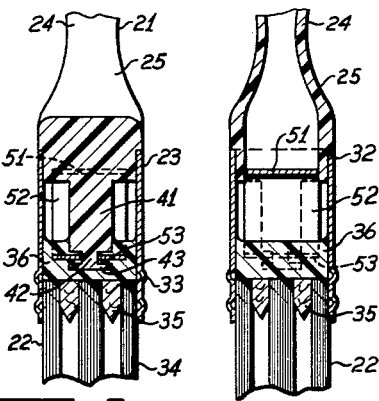
FIG. 9 is a section taken generally along the line 9—9 of FIG. 8.
FIG. 10 is a section taken generally along the line 10—10 of FIG. 8.
Figure 8:
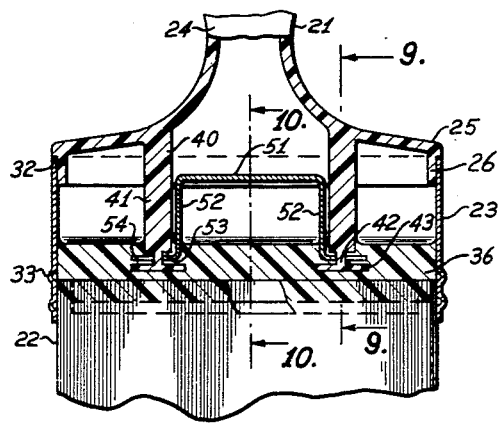
FIG. 8 is a section similar to FIGS. 3, 5, and 6 of a fourth embodiment of the invention.

As shown in FIGS. 8–10, the insert 50 is mounted between the extensions 41 with the body 51 disposed horizontally just above the lowermost edge of the peripheral wall 26. The legs 52 extend downwardly just inside of the extensions 41, and the connector portions 53 project outwardly with the reduced portions 42 of said extensions being disposed within the notches 54 of the inserts. Mounting of the insert to the brush handle is done prior to final assembly of the brush by bending or bowing the insert as above described to bring the connector portions 53 inwardly whereby the distal ends of said connector portions may be passed upwardly between the flanges 43 of the reduced portions 42. The legs and connector portion are subsequently released and either bent outwardly to their positions as shown in FIG. 8 or, if the insert is made of resilient material, are allowed to spring outwardly to the illustrated position.

FIG. 9 illustrates the manner in which the bifurcated connectors portions 53 pass on either side of the reduced portions 42 disposed in the notches 54. FIG. 10 shows particularly the manner in which the body 51 of the insert retains the side portions 27 of the wall 26 against inward collapse. It will be noted that the side portions 27 are interposed between the horizontally disposed body 51 and the vertically disposed walls of the ferrule 23. The width of the body portion is substantially the same as the normal distance between the opposed inner surfaces of the side portions 27 whereby when the insert is in place, said side portions cannot move toward each other.

It will be understood that in the fourth embodiment of the invention the bonding compound 36 is added, in its liquid state, after the insert has been placed in the position illustrated. When the compound hardens or is cured, the connector portions 53 along with the lower end portions of the extensions 41 are solidly locked within the hardened compound whereby the body 51 cannot move from its position between the side portions 27.

All of the embodiments illustrated herein set forth brush structures comprising hollow, molded handles which are consequently light in weight and which have, integrally molded therewith, extension means for bonding and interlocking with a bristle portion of the brush. In each case there is provided a mechanical connection between the bristle portion and the handle as well as an adhesive or bonding connection; and in each embodiment, means is provided for preventing the lateral collapse of the flat, side wall portions of a hollow brush handle.

It will be understood that many changes in the details of this invention as herein described and illustrated may be made without, however, departing from the spirit thereof or the scope of the appended claims.

What is claimed is:

1. A brush structure comprising a handle having a hollow, bristle receiving portion; said bristle receiving portion having downwardly directed, laterally spaced, generally parallel side walls; a pair of spaced webs connecting said walls; said webs having downwardly directed extensions; an insert member disposed between said side walls and having a width substantially equal to the distance between said side walls to prevent their inward collapse; said insert member having downwardly directed legs connected at their lower ends to the lower ends of said extensions; a bristle portion disposed adjacent to the lower ends of said extensions; a ferrule embracing said side walls and extending downwardly and embracing the upper end of said bristle portion; bonding compound permeating the upper end of said bristle portion and extending upwardly above the lower ends of said extensions; the lower end portions of said extensions having means interlocking with said compound disposed below the upper level of said compound.

2. A brush structure as set forth in claim 1 wherein the recited extensions have reduced portions adjacent their lower ends; the lower ends of said legs having connector portions projecting respectively in the directions of said reduced portions; and said connector portions being notched at their distal ends with said reduced portions disposed within said notches.

3. A brush structure as set forth in claim 2 wherein the lower ends of said reduced portions are provided with horizontally projecting flanges disposed beneath said connector portions; said bonding compound extending upwardly above said flanges and said connector portions.

4. A brush structure comprising a hollow plastic handle having an oblong, downwardly open bristle receiving portion; said bristle receiving portion having a downwardly directed, peripherally continuous wall; said wall having substantially flat, parallel side wall portions; a pair of integrally formed webs connecting said side wall portions and spaced from each other; said webs having integrally formed, downwardly directed extensions; the lower ends of said extensions having horizontally reduced portions and horizontally extending flanges below said reduced portions; a ferrule surrounding said wall and extending downwardly below said extensions; a bristle portion having a bristle knot disposed within the lower end of said ferrule; an insert member formed of sheet material having substantially a width equal to the distance between said side wall portions; said insert having a horizontal body portion disposed between said side wall portions and depending legs at either end disposed adjacent said extensions; said legs having oppositely directed, notched connector portions at the distal ends of said legs; said reduced portions of said extensions disposed respectively within said notches; and bonding compound permeating said bristle knot and extending upwardly within said ferrule above said flanges and said connector portions.

References Cited by the Examiner

UNITED STATES PATENTS

| 2,508,931 | 5/59 | Simms. | |
|---|---|---|---|
| 2,840,841 | 7/58 | Maxwell | 15—193 |
| 2,913,751 | 11/59 | Mardman et al. | 15—192 |
| 3,023,439 | 3/62 | Danley | 15—143 |
| 3,076,989 | 2/63 | Daw | 15—192 |
| 3,130,434 | 4/64 | Daw | 15—192 |
| 3,133,299 | 5/64 | Danley et al. | |

FOREIGN PATENTS

| 156,999 | 11/56 | Sweden. |
| 844,124 | 8/60 | Great Britain. |
| 874,950 | 8/61 | Great Britain. |
| 884,786 | 7/53 | Germany. |
| 1,185,047 | 2/59 | France. |
| 1,211,201 | 10/59 | France. |
| 1,238,091 | 6/60 | France. |

CHARLES A. WILLMUTH, *Primary Examiner.*